US005832586A

United States Patent [19]

Kennedy

[11] Patent Number: 5,832,586

[45] Date of Patent: Nov. 10, 1998

[54] CREDIT CARD IMPRINTER

[75] Inventor: Randall J. Kennedy, Kitchener, Canada

[73] Assignee: SBN Systems, Inc., Ontario, Canada

[21] Appl. No.: 210,951

[22] Filed: Mar. 21, 1994

Related U.S. Application Data

[62] Division of Ser. No. 53,669, Apr. 29, 1993, Pat. No. 5,385, 094.

[51] Int. Cl.$^{6}$ .............................. B41F 3/04; B23P 11/00

[52] U.S. Cl. .............................. 29/434; 29/897; 72/256

[58] Field of Search .............................. 29/434, 445, 897, 29/897.2; 72/254, 256; 101/56, 269

[56] References Cited

U.S. PATENT DOCUMENTS

| | | | |
|---|---|---|---|
| 3,830,155 | 8/1974 | Pinedo | 101/269 |
| 3,954,056 | 5/1976 | Barbour | 101/269 |
| 4,270,453 | 6/1981 | Strohschneider | 101/269 |
| 4,281,596 | 8/1981 | Bowen | 101/269 |
| 4,938,132 | 7/1990 | Finn et al. | 101/269 |
| 5,048,890 | 9/1991 | Masuda | 72/256 X |
| 5,062,361 | 11/1991 | Kabelsky | 101/269 |

*Primary Examiner*—Joseph M. Gorski
*Attorney, Agent, or Firm*—Antonelli, Terry, Stout & Kraus, LLP

[57] ABSTRACT

An imprinter in accordance with the invention includes a base (31) having a flatbed (32) for receiving a station plate (33) and a credit card (34) to be imprinted on a print receiving element and a carriage 29 movable in first and second directions to cause imprinting, respectively, by first and second rolling platens 42 and 44 each having an axle 50 rotatably supported in the carriage in opposed downwardly extending members (52) of the carriage. First and second pairs of openings (54) retain the axles (50) of the first and second rolling platens and have a length (58) and height (60) greater than the diameter of the axle which permits the axles of the rolling platens to move in the direction of motion during imprinting to provide alignment with first, second, third and fourth stops (70, 72, 74, 76) in the imprinting direction at one end (63) of the openings and further to permit orthogonal movement upward from the flatbed when an outside periphery (65) of one of the rolling platens has insufficient clearance to clear the station plate or credit card. The stops limit travel of the axle of the rolling platens orthogonally away from the base during imprinting to establish a position of the first and second rolling platens during imprinting relative to the flatbed.

6 Claims, 7 Drawing Sheets

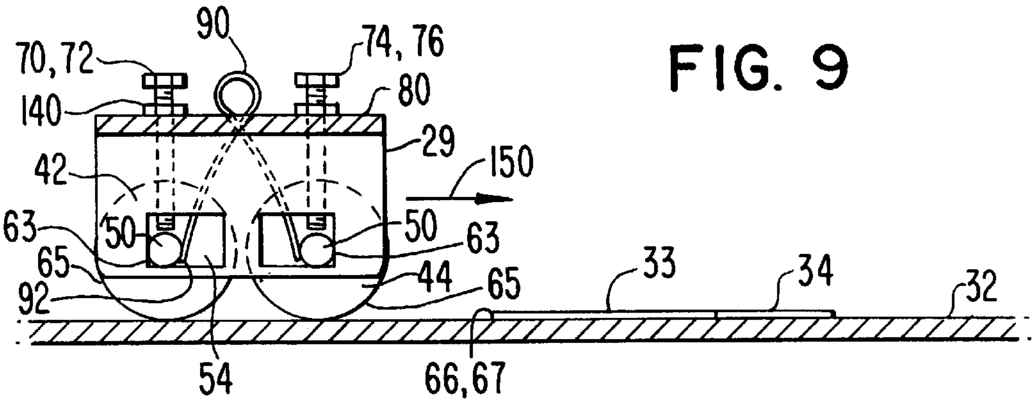
FIG. 9
FIG. 10
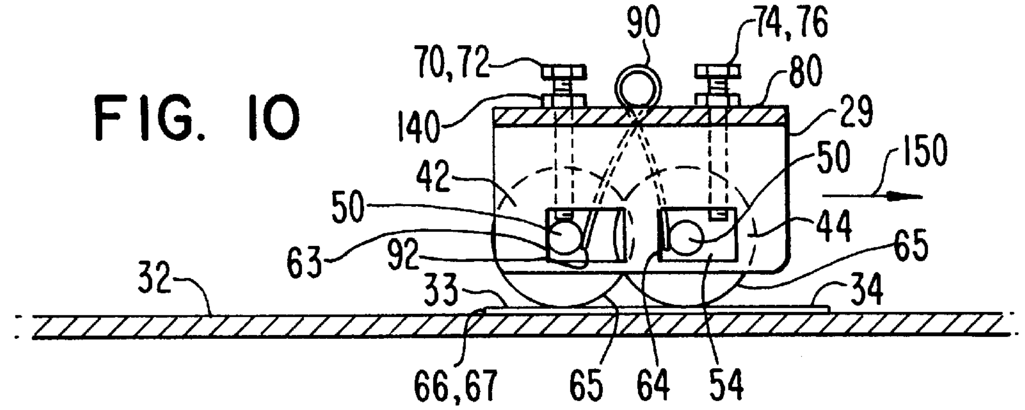
FIG. 11
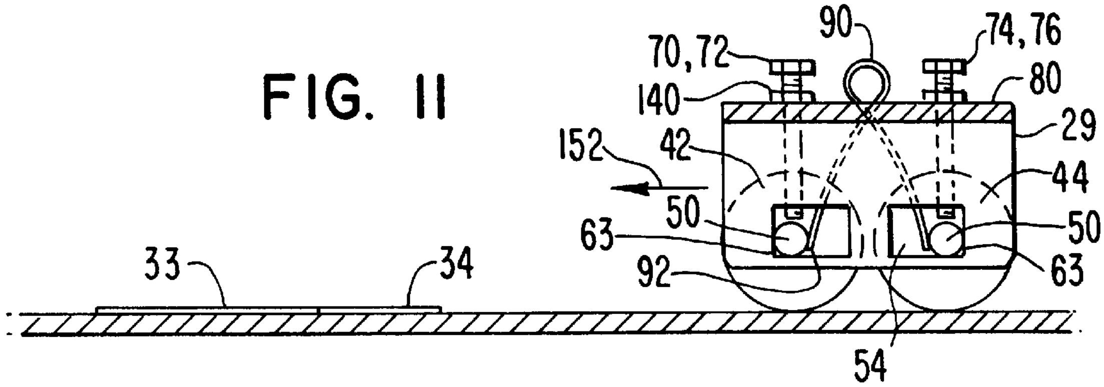
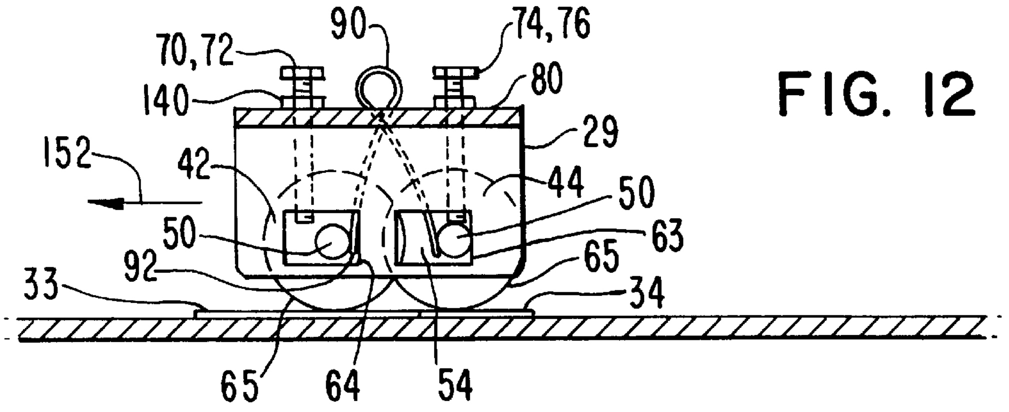
FIG. 12

CREDIT CARD IMPRINTER

This is a Divisional application of U.S. Ser. No. 08/053,669, filed Apr. 29, 1993 and now U.S. Pat. No. 5,385,094.

TECHNICAL FIELD

The present invention relates to imprinters used for imprinting characters from character bearing elements, such as credit cards, onto print receiving elements, such as formsets, used in credit transactions and to a method of manufacturing and assembly of imprinters of the foregoing type.

BACKGROUND ART

The Assignee of the present invention manufactures imprinters which are used for making imprints of a merchant's station plate and a credit card onto a formset for recording a credit transaction. Imprinters of this type have an extruded metal base which is made from aluminum and further a carriage which is a multiple piece element, including thermoplastically molded parts, to which are attached first and second rolling platens which respectively imprint the image of the station plate by moving the carriage in a first direction and the image of the credit card by moving the carriage in the opposite return direction. This type of imprinter is known as the double roller, double stroke imprinter in the industry.

FIGS. 1–4 illustrate the current design of the carriage mechanism used in imprinters manufactured by the Assignee of the present invention of the aforementioned double roller, double stroke design. These imprinters have a thermoplastic piece 10 to which are joined a pair of metallic side plates 12. The side plates 12 each contain a pair of axles 14 on which thermoplastically molded wheels 16 are mounted for engaging the lower rails respectively located on the sides of the imprinter. Additionally, the thermoplastically molded piece 10 contains a pair of molded slots 18 which each are defined by inboard wall 20 and the outer metallic plate 12. The metallic plates 12 are attached to the thermoplastic piece 10 by metallic fasteners 22.

The molded slot 18 defined by the inboard wall 20 and outer plate 12 holds a wheel mounting mechanism 24 which rotatably supports a third wheel 26 which is attached to an axle (not illustrated) of the wheel mounting mechanism. The third wheels 26 ride upon an upper rail on the respective sides of the extruded aluminum base of the imprinter opposite to the lower rails on which the lower wheels 16 ride.

It is important that spacing of the carriage with respect to the flatbed of the imprinter be adjusted within a set range. In order to obtain a high quality imprint which is OCR readable, it is necessary that a set range of clearance exist between the rolling platens and the base of the imprinter during imprinting. The wheels which support the carriage on the rails of the base must be adjusted to be spaced from each other within a set range so that unacceptable play orthogonal to the flatbed of the imprinter during imprinting does not exist, which would degrade the quality of the imprint, before the clearance between the rolling platens and flatbed can be set. An initial adjustment of the wheels which support the carriage may require between 0 and 0.002 of an inch of play between the wheels 16 and 26 and the rails (not illustrated) of the base of the imprinter, to permit a proper height adjustment to be subsequently made for the rolling platens carried by the carriage relative to the flatbed to insure that a high quality optical character readable (OCR) image is achieved. The prior art carriage mechanism, including the molded piece 10, sets the spacing between the wheels 16 and 26 and the rails within the aforementioned range by adjustment of screw 28. Turning the screw 28 inward into the top surface 30 of the piece 10 causes the end 32 of the screw to force the wheel mounting mechanism 24 downward to lessen the spacing between the wheels 16 and 26 which reduces the orthogonal play between the wheels and the rails. Turning the screw 28 outward has the opposite effect.

The prior art carriage of FIG. 1 has several disadvantages. In the first place, the molding of the thermoplastically molded piece 10 requires between 20 and 30 seconds because of the thermal cycling required for the molding process which slows the throughput of molding the molded carriage piece when compared to other forming techniques such as metal extrusion which heretofore has not been successfully used in the manufacturing of imprinter carriages. Additionally use of a wheel mounting mechanism 24, which requires attachment to the thermoplastically molded piece 10 and the adjustment thereof to set the spacing between the lower wheels 16 and the top wheel 26 and the rails to the aforementioned set range adds substantial expense to the overall cost of the imprinter. The cost of manufacturing an imprinter is a significant factor in its salability with any appreciable reduction the manufacturing costs of an imprinter with the capability of imprinting clear OCR readable characters representing a significant improvement which will increase sales.

In the prior art imprinters with metallic carriages have been manufactured by various processes. Multiple stage piercing of flat plate has been used. Others, including the Assignee, have used steel strip, which is a flat material, which does not permit internal features to be installed in the part without secondary addition of components requiring additional parts and labor. Such components include assembled roller brackets. More recently, carriages have been made by die casting which provides the ability to form internal features during the casting process which eliminates the requirement for additional parts. However, while die casting has the advantage of providing a complete assembly including internal parts with high dimensional tolerances, it has the disadvantage of being an expensive process.

Previously, the Assignee has used an eccentric mount for the third wheel of the carriage support to set the spacing between the third wheel and the first and second wheels and the rails of the base to achieve the aforementioned set spacing. The eccentric mount was adjusted to vary the spacing between the axle supporting the third wheel and the first and second wheels. Eccentric mounts add parts and labor expense to imprinter cost.

U.S. Pat. Nos. 4,270,453 and 4,281,596 disclose a double rolling platen, double stroke imprinter having a carriage with first and second pairs of inclined slots mounted in downwardly extending sides which support the axles of a pair of rolling platens. For movement of the carriage in a direction in which one of the rolling platens is not imprinting, the slots function to guide the axle supporting the platen which is not imprinting upward so that the lifted rolling platen will roll over the station plate or credit card without imprinting character information onto the formset. However, for movement of the carriage in a direction in which one of the rolling platens is imprinting, the slots supporting the axle of the imprinting platen force the axle of the imprinting platen downward to exert imprinting pressure on the station plate or credit card to imprint characters onto the formset.

The carriage of the '453 and '596 patents transmits the force of imprinting transferred through the rolling platen axles to the top surface of the pair of slots contained within the side walls of the carriage to the bed of the imprinter and to the wheels riding on the base which support the carriage during the imprinting stroke. However, the carriage of the '453 and '596 patents is of a complex shape requiring precise dimensional tolerances to maintain proper spacing between the rolling platens and the flatbed. The clearance between the flatbed and the rolling platens is established by the axles of the rolling platens contacting the top surface of the aforementioned pairs of slots without any adjustment mechanism being provided for varying the height of the rolling platens. As a result, precise dimensional tolerance is required in the forming of the slots in the sides of the carriage to achieve an OCR image. Manufacturing an imprinter with components having precise dimensional tolerances adds to its expense.

In order to obtain a high quality imprint which is OCR readable, it is necessary that a set range of clearance exist between the rolling platens and the base of the imprinter during imprinting. The wheels which support the carriage on the rails of the base must be adjusted to be spaced from each other within a set range so that unacceptable play orthogonal to the flatbed of the imprinter during imprinting does not exist, which would degrade the quality of the imprint, before the clearance between the rolling platens and flatbed can be set.

DISCLOSURE OF THE INVENTION

The present invention provides an improved imprinter and method of manufacturing and assembly thereof which achieves substantial cost savings when compared to the prior art as exemplified by the Assignee's previous credit card imprinters. The present invention provides cost savings for the manufacturing of the carriage of an imprinter when compared to the prior art of FIGS. 1–4 of approximately 50% by utilizing an extrusion to form the carriage. The invention also utilizes metal machining operations permitting cutout areas in the extrusion to be made prior to bending of the sides of the extrusion to form the opposed downwardly extending sides of the carriage which also contain a bendable rib to which the upper wheel of the carriage support is attached that is bent to set the spacing between the upper and lower wheels of the carriage. The invention also provides forming first and second pairs of openings which support axles of first and second rolling platens in the downwardly extending members of the extrusion in combination with first and second pairs of stops mounted in the carriage which are used for setting the spacing of the first and second rolling platens relative to the flatbed during movement of the carriage to imprint a station plate and credit card. The openings are formed with a length and a height which is greater than the diameter of the axles supporting the rolling platens so that contact of the outside periphery of the first and second rolling platens with a print bearing element, such as a station plate or credit card, forces the axles of the rolling platens orthogonally upward from the flatbed to engage the stops mounted in the carriage adjacent to first and second sides of the rolling platens to set the clearance required for the imprinting of a high quality OCR readable image and to provide clearance between the rolling platens and the credit card and station plate during movement in the nonimprinting direction permitting the rolling platens to be lifted from contact with the credit card or station plate without contacting the stops that prevents a double image from being imprinted. If substantial pressure is exerted between the rolling platen and the credit card and station plate during movement of the carriage in the nonimprinting direction, a double imprint can be produced which interferes with OCR reading.

The present invention further provides an improved process for setting the clearance between the upper and two lower wheels on each side of the carriage which respectively ride on the upper and lower rails of the base of the imprinter without having to add adjustment elements which in the prior art have to be attached to the carriage after the carriage metal forming operations have been completed. The top wheel on each side of the carriage, which rides on the top rail of the base, is attached by an axle which extends through a rib with each rib being defined by cutout areas respectively defining opposed sides of the rib that are formed integrally with the metal working operations. After the carriage is joined to the base so that the sets of wheels support the carriage for motion along the base by rolling contact of the sets of wheels with the rails, the ribs are deformed with a handtool which bends the rib orthogonally toward or away from the flatbed to set the spacing between the upper and lower wheels of each side of the carriage within a set range which tightens the support of the carriage by the wheels so that the carriage does not move substantially orthogonally to the flatbed during imprinting with unacceptable play (greater than the set spacing). The hand tool has an elongated portion which is inserted into the cutout area above or below the upper wheel and is rotated so that the elongated section contacts and deforms the cutout area upon rotation of the tool after contact with the sides of the cutout area to move the upper wheel downward or upward to set the spacing within the set range which is a simple and low cost adjustment.

An imprinter in accordance with the invention includes a base having a flat bed for receiving at least one character bearing element having characters to be imprinted on a print receiving element; a carriage having a plurality of wheels joined to opposed sides of the carriage which rotatably support the carriage in first and second directions of motion of the carriage along the base and which limit movement of the carriage orthogonal to the flatbed during movement in the first and second directions; a first rolling platen having an axle rotatably supported in the carriage in opposed downwardly extending members of the carriage; a first pair of openings disposed respectively in the opposed downwardly extending members for retaining the axle of the first rolling platen during movement of the carriage in the first and second directions with each opening having a height in a direction orthogonal to the flatbed greater than a diameter of the axle of the first rolling platen which permits the axle of the first rolling platen to move orthogonally away from the flatbed when an outside periphery of the first rolling platen has insufficient clearance to clear the at least one character bearing element during movement in the first and second directions; first and second stops mounted in the carriage which extend toward the flatbed and which limit travel of the axle of the first rolling platen orthogonally away from the flatbed during imprinting to establish a position of the first rolling platen during imprinting relative to the flatbed, the first stop engaging the axle of the first rolling platen during imprinting at a position axially displaced from a first side of the first rolling platen and the second stop engaging the axle of the first rolling platen during imprinting at a position axially displaced from a second side of the first rolling platen opposed to the first side. The first pair of openings extend parallel to the flatbed for a distance that is greater than a diameter of the axle of the first rolling platen so that the axle of the first rolling platen is free to roll between first and second ends of the first pair of openings in the first and second directions during movement of the carriage in the first and second directions; and the first and second stops are mounted in the carriage to engage the axle of the first rolling platen at one of the first and second ends of the first pair of openings during imprinting by the first rolling platen.

The invention further includes a second rolling platen having an axle rotatably supported in the carriage in the opposed downwardly extending members of the carriage; a second pair of openings disposed respectively in the opposed downwardly extending members for retaining the axle of the second rolling platen during movement of the carriage in the first and second directions with each opening of the second pair of openings having a height in a direction orthogonal to the flatbed greater than a diameter of the axle of the second rolling platen which permits the axle of the second rolling platen to move orthogonally away from the flatbed when an outside periphery of the second rolling platen has insufficient clearance to clear the at least one character bearing element during movement in the first and second directions; and third and fourth stops mounted in the carriage which extend toward the flatbed and which limit travel of the axle of the second rolling platen orthogonally away from the flatbed during imprinting to establish a position of the second rolling platen during imprinting, the third stop engaging the axle of the second rolling platen during imprinting at a position axially displaced from a first side of the second rolling platen and the fourth stop engaging the axle of the second rolling platen during imprinting at a position axially displaced from a second side of the second rolling platen opposed to the first side. The second pair of openings extend parallel to the flatbed for a distance that is greater than the diameter of the axle of the second rolling platen so that the axle of the second rolling platen is free to roll between first and second ends of the second pair of openings in the first and second directions during movement of the carriage in the first and second directions; and the third and fourth stops are mounted in the carriage to engage the axle of the second rolling platen at one of the first and second ends of the second pair of openings during imprinting by the second rolling platen. The first and second pairs of openings are spaced apart along a dimension of the members parallel to the first and second directions and are spaced an identical distance measured orthogonally from the flatbed during movement in the first and second directions. The first, second, third and fourth stops are threaded in a top part of the carriage to provide adjustment of the extension of the stops toward the flatbed to provide a height adjustment of the position of the first and second rolling platens with respect to the flatbed during imprinting.

The first and second pairs of openings have a first lower surface which has a section parallel to the flatbed on which the axles of the first and second rolling platens respectively roll. Furthermore, the lower surface of the first and second pair of openings may also have a second section which is inclined with reference to the flatbed and which is joined to the first section with the axle of the first and second rolling platens respectively being disposed closest to the second section when the axle of the first and second rolling platen is in a position at which contact with the first and second stops cannot be made.

In a preferred embodiment of the present invention, the carriage is a metallic extrusion which is formed without high dimensional tolerances and which is preferably aluminum and, in conventional usages of the invention, the at least one character bearing element is a station plate and a credit card which is used to imprint a formset having multiple sheets of paper as part of a conventional credit transaction in which the multiple sheets of paper are imprinted to provide records of the transaction.

In an imprinter having a base having a flatbed for receiving at least one character bearing element having characters to be imprinted on a print receiving element, a carriage having at least one rolling platen for imprinting characters of the at least one print bearing element on the print receiving element and two sets of wheels on opposed sides of the carriage with each set of wheels having an upper wheel and two lower wheels which respectively roll in contact with upper and lower rails disposed on the base and extending parallel to a direction of motion of the carriage, a method for setting spacing between the upper and lower wheels in accordance with the invention includes forming the carriage with each opposed side having a rib to which the axle of the upper wheel is attached with each rib being defined by cutout areas respectively defining opposed sides of the rib; joining the carriage to the base so that the sets of wheels support the carriage for motion along the base by rolling contact of the sets of wheels with the rails; and deforming the ribs to set the spacing between the upper and lower wheels of each set of wheels within a set range. The carriage is formed by extruding a metallic blank having a top surface having a center section and two outboard sections respectively extending from the center section with a surface of the sections being disposed generally in a single plane; and deforming the extruded metallic blank to bend the outboard sections to form the opposed sides of the carriage with the opposed sides being orthogonal to the center section. The cutout areas are formed after extrusion and prior to bending the outboard sections to form the opposed sides.

The process further includes extruding the metallic blank with members extending orthogonally from the center section; cutting first and second pairs of openings in the members after extrusion and prior to bending the outboard sections to form the opposed sides with the openings in each member being separated and being spaced identically from the center section so that the openings in each member are in line; and attaching first, second, third and fourth stops to the center section of the extruded carriage and adjusting extension of the stops from the center section toward the flatbed after joining the carriage to the base to limit travel of axles of first and second rolling platens received within the opposed openings within the members orthogonally away from the flatbed during imprinting to establish a position of the rolling platens during imprinting. The first and second stops are attached to the center section in a first line orthogonal to the direction of motion of the carriage during imprinting with the first line being vertically aligned with an end of the first pair of openings closest to a first end of the base, the first stop engaging the axle of the first rolling platen during imprinting at a position axially displaced from a first side of the first rolling platen and the second stop engaging the axle of the first rolling platen at a position axially displaced from a second side of the first rolling platen opposed to the first side and the third and fourth stops are attached to the center section in a second line parallel to the first line and orthogonal to the direction of motion of the carriage during imprinting with the second line being vertically aligned with an end of a second pair of openings closest to a second end of the flatbed, the third stop engaging the axle of the second rolling platen during imprinting at a position axially displaced from a first side of the second rolling platen and the fourth stop engaging the axle of the second rolling platen at a position axially displaced from a second side of the second rolling platen opposed to the fourth side. The first and second pairs of openings are cut with a height and length which is greater than a diameter of the axles supporting the first and second rolling platens with a surface of the openings supporting rolling of the axles during movement of the carriage. The surface has a first section parallel to a surface of the center section and to the flatbed and may include a second section which is inclined with respect to the first surface which is not parallel to the surface of the center section and to the flatbed.

A process for manufacturing an extruded metallic carriage of an imprinter in accordance with the invention includes extruding a metallic blank having a center section, two outboard sections respectively extending from the center section with a surface of the sections being disposed generally in a plane and a pair of members which are symmetrically located with respect to a centerline of the center section and which respectively extend an equal distance orthogonally from the center section; forming first and second pairs of openings within the members with the first opening of each pair of openings being disposed in one of the members and a second opening of each of a pair of openings being disposed in another of the members with the first and second pairs of openings respectively receiving an axle supporting first and second rolling platens used for imprinting of characters of a pair of print bearing elements onto a print receiving element; and bending the outboard sections to form opposed sides of the carriage extending orthogonally relative to the center section to which wheels rotatably supporting movement of the carriage on rails of the base are attached after forming of the openings is completed. The process further includes cutting cutout areas in the outboard sections which define a rib prior to the bending of the outboard sections to form the opposed sides; mounting a wheel on each rib and an additional pair of wheels on each of the opposed sides after bending is completed; attaching the carriage to the base so that the wheels roll on the rails and deforming the ribs to set spacing between the wheels attached to each rib and the additional pair of wheels on each of the opposed sides within a set range.

First, second, third and fourth stops are attached to the center section of the extruded carriage and extension of the stops from the center section toward the flatbed is adjusted after joining the carriage to the base and placing axles of the platens within the first and second pairs of openings to limit travel of the axles of first and second rolling platens received within the opposed openings within the members orthogonally away from the flatbed during imprinting to establish a position of the rolling platens during imprinting.

BRIEF DESCRIPTION OF DRAWINGS

FIG. 9 illustrates a simplified view during movement of the carriage during movement in a first direction prior to contacting of the rolling platens with a character bearing element.

FIG. 10 illustrates a simplified view of the carriage moving in the first direction after contact of one of the rolling platens with a character bearing element.

FIG. 11 illustrates a simplified view of the carriage moving in a second direction prior to contact of the rolling platens with a character bearing element.

FIG. 12 illustrates a simplified view of the carriage moving in the second direction after the other of the rolling platens has contacted a character bearing element.

BEST MODE FOR CARRYING OUT THE INVENTION

Figure 1:
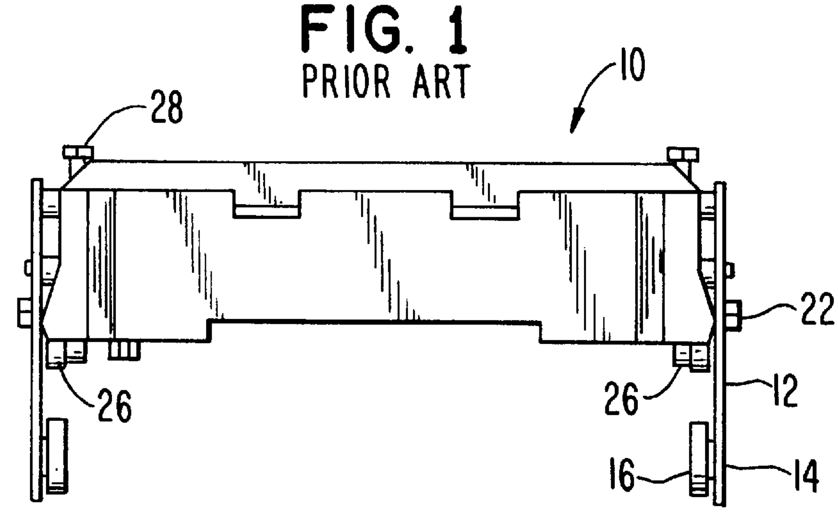
FIG. 1 PRIOR ART
FIG. 1 illustrates a side elevational view of a prior art carriage manufactured by the Assignee of the present invention.
Figure 2:
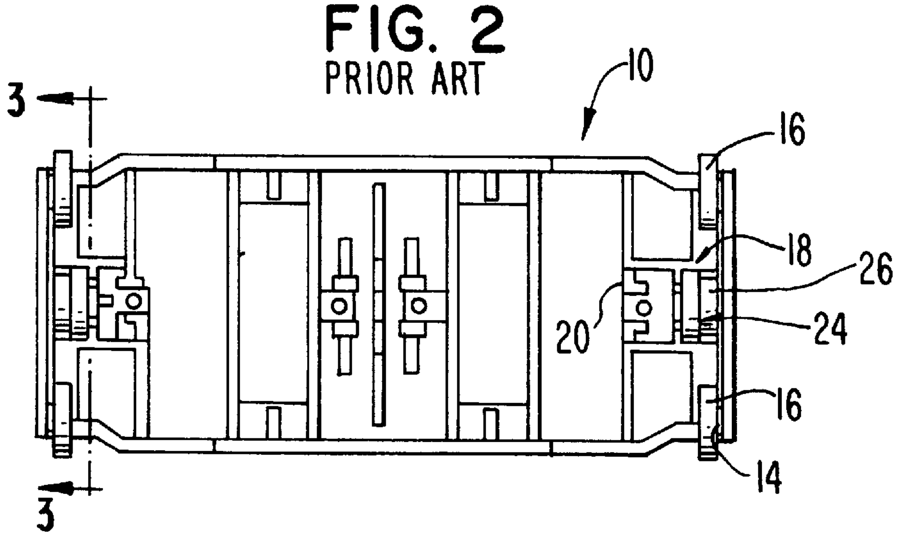
FIG. 2 PRIOR ART
FIG. 2 illustrates a bottom view of the carriage assembly of FIG. 1.
Figure 3:
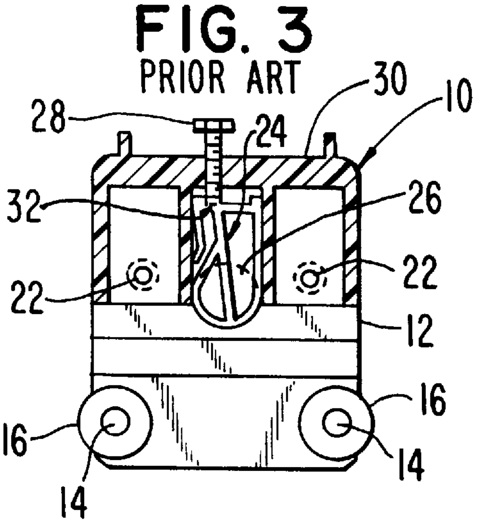
FIG. 3 PRIOR ART
FIG. 3 illustrates a sectional view taken along section lines 3—3 of FIG. 2.
Figure 4:
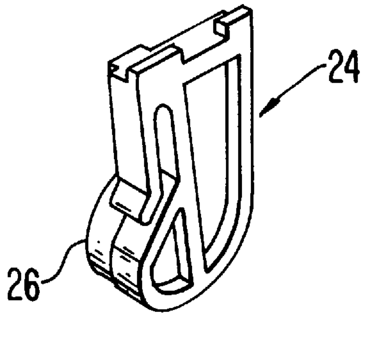
FIG. 4 PRIOR ART
FIG. 4 illustrates a wheel mounting mechanism illustrated in FIGS. 1–3.

FIGS. 5–8 illustrate an imprinter in accordance with the present invention having an improved carriage that may be manufactured from extruded metal, such as aluminum, resulting in an approximate 50% savings in the overall cost of the manufacturing of the carriage when compared to the cost of manufacturing of the Assignee's prior carriage as described in conjunction with FIG. 1. Like reference numerals identify like parts in FIGS. 5–19. The base 31 of the imprinter is conventional in construction and is formed preferably from an aluminum extrusion. The base 31 has a flatbed 32 to which is attached at least one character bearing element which, as illustrated, is comprised of a conventional station plate 33 and a conventional credit card 34, each of which have a plurality of characters 35 to be imprinted on a formset 36 outlined in phantom which is a multiple page document with each page being imprinted by the characters borne by the station plate and credit card as conventionally used in the credit transaction industry. Furthermore, the sides 37 of the base each have upper and lower rails 38 and 40 formed in the extrusion from which the base is made. The upper and lower rails 38 and 40 perform the conventional function of transferring forces applied to the rolling platens 42 and 44 that respectively imprint the characters 35 of the station plate 33 and the credit card 34 during movement of the carriage 29 in opposite directions as discussed below in conjunction with FIGS. 9–12 to the base 31 so that sufficient pressure is maintained to obtain a clear OCR readable imprint.

The carriage 29 and method of manufacture, as described below in detail, differ from the prior art in several aspects. First, the carriage 29 is formed from extruded metal which is preferably aluminum which is inexpensive to form as a consequence of the extrusion process being much more rapidly performed for forming each blank used to make a carriage than the corresponding thermoplastic molding operation of the prior art. Metal forming operations for producing the carriage are discussed below in conjunction with FIGS. 16–19. As is known to those skilled in the art, extrusion of metals through dies, while being a relatively inexpensive process in comparison to die casting or thermoplastic molding of plastics, has the disadvantage of not having precise dimensional tolerances. However, the present invention does not require precise dimensional tolerances to be maintained in the extruded carriage as a consequence of a new mechanism for suspending the rolling platens 42 and 44 relative to the flatbed 32 to set the height of the rolling platens precisely during imprinting of images from the station plate 33 and credit card 34 and further as a consequence of a mechanism for precisely setting the spacing between upper and lower wheels 96 and 98 which roll on the upper and lower rails 38 and 40 to transfer the forces applied to the rolling platens during imprinting through the carriage to the rails of the base 31 by setting the spacing between the upper and lower wheels within a set range which in a preferred embodiment of the present invention is between 0 and 0.002 inches.

The system for suspending the rolling platens 42 and 44 within the extruded carriage 29 is of low cost to manufacture, is easily adjusted to set the rolling platens to a preset height necessary to produce a high quality OCR imprint of the characters on the station plate 33 and credit card 34 and has a small number of parts. The rolling platens 42 and 44 are respectively attached to an axle 50. While the invention is not limited thereto, the carriage has a pair of downwardly extending members 52 which are formed preferably by the extrusion process. First and second pairs of openings 54 respectively receive the axles 50 attached to the first and second rolling platens 42 and 44. The openings 54 have a length 58 and a height 60 which is greater than the diameter of the axle 50 which permits the axles to roll along surface 62 during movement of the carriage in first and second directions to respectively imprint characters of the station plate 33 and credit card 34 so that the axles are free to roll between first and second ends 63 and 64 and further is free to move orthogonally upward from the flatbed 31 when the outside periphery 65 of the rolling platens 42 and 44 contacts the raised edge 66 of the station plate 33 or raised edge 67 of credit card 34 during movement of the carriage for imprinting. The length 58 of the openings is sufficient to permit the axles 50 to move freely upward without the application of force from the outside periphery 65 of the rolling platens 42 and 44 to the formset 36 and station plate 33 and credit card 34 to cause an imprint. Thus, when the carriage 29 is moved in a direction in which one of the first and second rolling platens 42 and 44 does not imprint, contact of the outside periphery 65 of one of the rolling platens 42 and 44 causes the axle 50 to lift freely orthogonally upward away from the height 60 of the openings 54.

First, second, third and fourth stops 70, 72, 74 and 76, which are of adjustable length relative to the bottom surface 78 of the center section 80 of the carriage 29, determine the position of the rolling platens 42 and 44 relative to the flatbed 32 that is important for producing a high quality OCR readable image during imprinting. The first stop 70 engages the axle 50 of the first rolling platen 42 during imprinting at a position displaced from a first side 82 of the first rolling platen 42 and the second stop 72 engages the axle of the first rolling platen during imprinting at a position axially displaced from the second side 84 opposite the first side. Similarly, the third and fourth stops 74 and 76 respectively engage the axle 50 of the second rolling platen 44 during imprinting at a position axially displaced from a first side 86 of the second rolling platen 44 and the fourth stop 76 engages the axle of the second rolling platen during imprinting at a position axially displaced from a second side 88 of the second rolling platen opposed to the first side 86. The first pair of openings 54 and the second pair of openings 54 extend in the first and second directions of travel of the carriage as described below in conjunction with FIGS. 9–12 along a length 58 that is greater than the diameter of the axle 50 so that the axle of the first rolling platen 42 is free to roll between first and second ends 63 and 64 of the first pair of openings in the first and second directions during movement of the carriage in the first and second directions. The first and second stops 70 and 72 and the third and fourth stops 74 and 76 are respectively preferably threaded in the carriage to engage the axle 50 of the first and second rolling platens 42 and 44 at the end 63 of the first and second pairs of openings during imprinting by the first and second rolling platens. The end 63 is disposed closest to an end of the base 31 at which movement of the carriage is initiated to begin imprinting with the first and second rolling platens 42 and 44.

A pair of hair springs 90 extend downward through the center section 80 of the carriage which have ends 92 which engage a recess 94 cut in each of the axles 50 adjacent and inboard of the downwardly extending members 52 to apply a spring bias to maintain separation of the axles. These springs 90 tend to quiet down the operation of the imprinter to prevent a sensation that the rolling platens rattle in the carriage during movement.

The carriage of the imprinter of the present invention has opposed sides 95 to which are attached an upper wheel 96 and a pair of lower wheels 98 providing a three-point suspension which is in rolling contact with the upper and lower rails 38 and 40. The three point suspension performs the same overall function as in the prior art carriage suspensions discussed above. Each side 95 includes an upper cutout area 100 and a lower cutout area 102 which have sides 106 and 108 defining a horizontally disposed rib 110 with a center section 112 of increased width to which is attached an axle 114 for the upper wheel 96. In accordance with a preferred embodiment of the present invention, proper setup of the imprinter after attachment of the carriage 29 to the base 31 requires the spacing between the upper and lower wheels 96 and 98 to be set within a range which provides from 0 to 0.002 of an inch of orthogonal play with respect to rails 38 and 40 of the base 30 of the imprinter.

Figure 13:
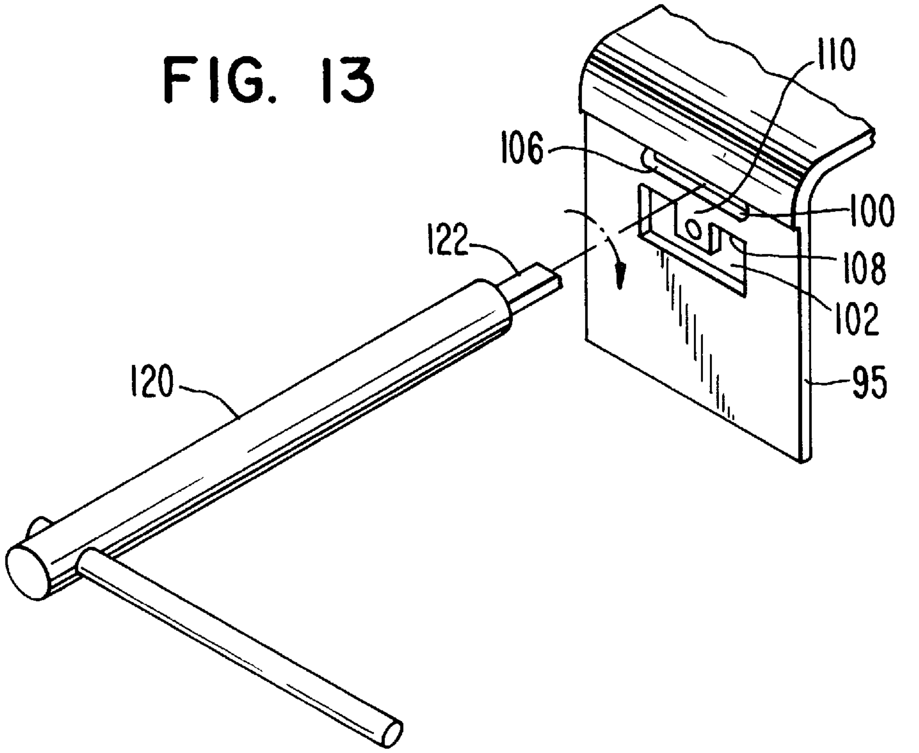
FIGS. 13 and 14 illustrate a preferred process for deforming a rib to which the upper wheel on each side of the carriage assembly is attached to set the spacing between the upper and lower wheels of each set of wheels supporting the carriage within a set range.
Figure 14:
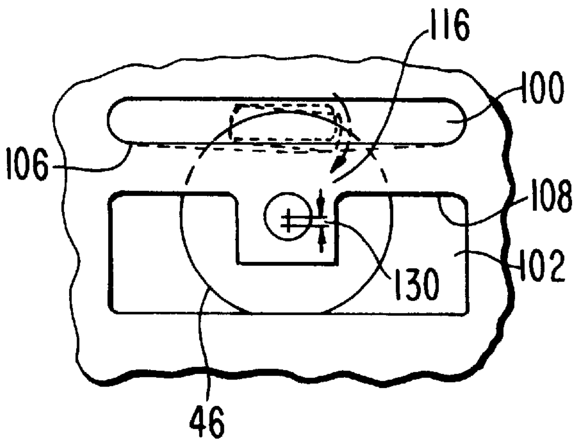

Setting of the wheel spacing of the carriage 29 within this range is preferably achieved by a hand tool 120 illustrated in FIGS. 13 and 14. The hand tool 120 has an elongated section 122 which is positioned in the upper or lower cutout areas 100 and 102 adjacent to the center section 110 as illustrated in FIGS. 13 and 14. The tool 120 is twisted such that the rib 110 is deformed downward or upward to produce deflection 130 to produce spacing within the preferred range of 0 to 0.002 inches at the time of assembly so that the carriage 29 has the requisite tightness of attachment to the base 31 to prevent unacceptable orthogonal play with reference to the flatbed 31. If the deformation of the rib 110 by spreading the width of the upper cutout section 100 is too great, the tool 120 may be used to widen the lower cutout section 102 adjacent to the thickened section 112 of the rib 110 to lessen friction between the upper and lower sets of wheels 96 and 98 if deformation 130 of the upper cutout section 100 is too great. This adjustment is easily made at little cost and has the advantage that the metal working process, as described below, makes the cutout sections at very little expense.

After the aforementioned adjustment 130 of the spacing of the upper wheel 96 relative to the lower wheels 98 has been made to tighten the orthogonal play within the carriage 29 into the set range of 0 to 0.002 of an inch play between the rails 38 and 40, the imprinter is ready for setting of the first, second, third and fourth stops 70, 72, 74 and 76 to provide the desired height of the axles 50 relative to the flatbed 29 during imprinting. This adjustment is easily performed by setting the stops 70, 72, 74 and 76 to a preset tolerance and locking the lock nuts 140 after the correct vertical height of the first and second rolling platens 42 and 44 has been set. As a result, the carriage 29 has a simplified design when compared to the Assignee's prior art carriage which permits the use of metal extrusions which do not have high dimensional tolerances while ultimately achieving the requisite settings for spacing between the upper wheel 96 and the lower wheels 98 of the sides of the carriage 95 and thereafter the setting of the stops 70, 72, 74 and 76 to control the height of the rolling platens 42 and 44 above the flatbed 31 required to make a high quality clear imprint of the station plate 33 and credit card 34.

FIGS. 9 and 1f illustrate an operational sequence for imprinting the image of the station plate 33 by the platen 42 produced by movement in a first direction 150. Prior to contact of the outside periphery 65 of the rolling platen 42 with the edge 66 of the station plate 33, hair spring 90 biases the axles 50 toward the ends 63 of the openings 54 as illustrated in FIG. 9. At this point, it should be noted that the stops 70 and 72 do not contact the axle 50 of the rolling platen 42. As the carriage continues to move to the right, the outside periphery 65 of the rolling platen 42 contacts the edge 66 of the credit card 33 which causes the axle 50 to move orthogonally upward away from the flatbed 32 to a point where the outside periphery 65 contacts the leading edge 66 of the credit card 33. As illustrated in FIG. 10, the result of this contact causes the axle 50 of the rolling platen 42 to be forced orthogonally upward from the flatbed to contact the bottom of the stops 70 and 72 which establish the position of the rolling platen 42 for imprinting the station plate. At this time, it should also be noted that contact of the outside periphery 65 of the rolling platen 44 with the credit card 34 forces the rolling platen to the left so that the contact of the leading edge 67 of the credit card 34 forces the rolling platen to the left causing compression of the hair spring 90. As a result of the movement of the axle 50 to the left, the rolling platen 44 is free to move orthogonally upward away from the flatbed 32 without contacting the bottom of the stops 74 and 76. As a result, the formset (not illustrated) is not imprinted with the characters on the credit card 34.

FIGS. 11 and 12 illustrate the movement of the carriage 29 in the second direction 152 for imprinting the credit card 34. FIG. 11 illustrates the same position of the rolling platens 42 and 44 as illustrated in FIG. 9 as a consequence of the roller platens not contacting the station plate 33 or credit card 34. FIG. 12 illustrates the same operational mode as in FIG. 10 except that the positions of the rolling platens 42 and 44 are reversed in that the rolling platen 42 is lifted upward and to the right as consequence of contact of the outside periphery 65 of the rolling platen 42 with the edge 66 of the station plate 33. On the other hand, contact of the outside periphery 65 of the rolling platen 44 with the edge 67 of the credit card 34 causes the axle 50 to be lifted orthogonally away from the flatbed 33 to contact the bottom of the stops 74 and 76 which establishes the position of the rolling platen 44 for imprinting the credit card.

As is apparent from FIGS. 7–12, the axles 50 do not move axially in response to contact of the outside periphery 65 of the first and second rolling platens 42 and 44 with the station plate 33 or credit card 34.

Figure 15:
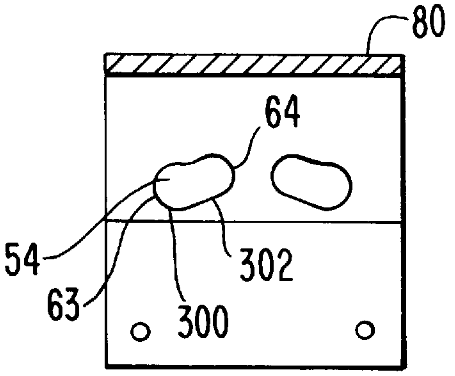
FIG. 15 illustrates an alternative embodiment of the openings illustrated in FIGS. 9–12.

FIG. 15 illustrates an alternative embodiment of the present invention in which the first and second pairs of openings 54 have a first section 300 which is parallel to the undersurface 78 of the center section 80 and a second section 302 which is inclined with respect to the first section and which is not parallel to the surface of the center section and the flatbed 32. The function of the inclined section 302 is to orthogonally lift the axles 50 of the rolling platens 42 and 44 above a position at which the outside periphery 65 of the platens would contact the station plate 33 and credit card 34 during motion of the carriage in a non-imprinting direction. The rapid acceleration of the carriage in a nonimprinting direction which typifies imprinting tends to cause the axles 50 to run up the inclined slope of section 302 which lifts them orthogonally above a position at which the outside periphery 65 would contact the formset 36 which is resting on the station plate 33 and credit card 34 to a degree causing smudging that could degrade the quality of the image. It should be understood that the inclined section 302 is not necessary for practicing the invention and may be provided to insure that smudging does not occur during the nonimprinting stroke for each of the rolling platens 42 and 44.

Figure 16:
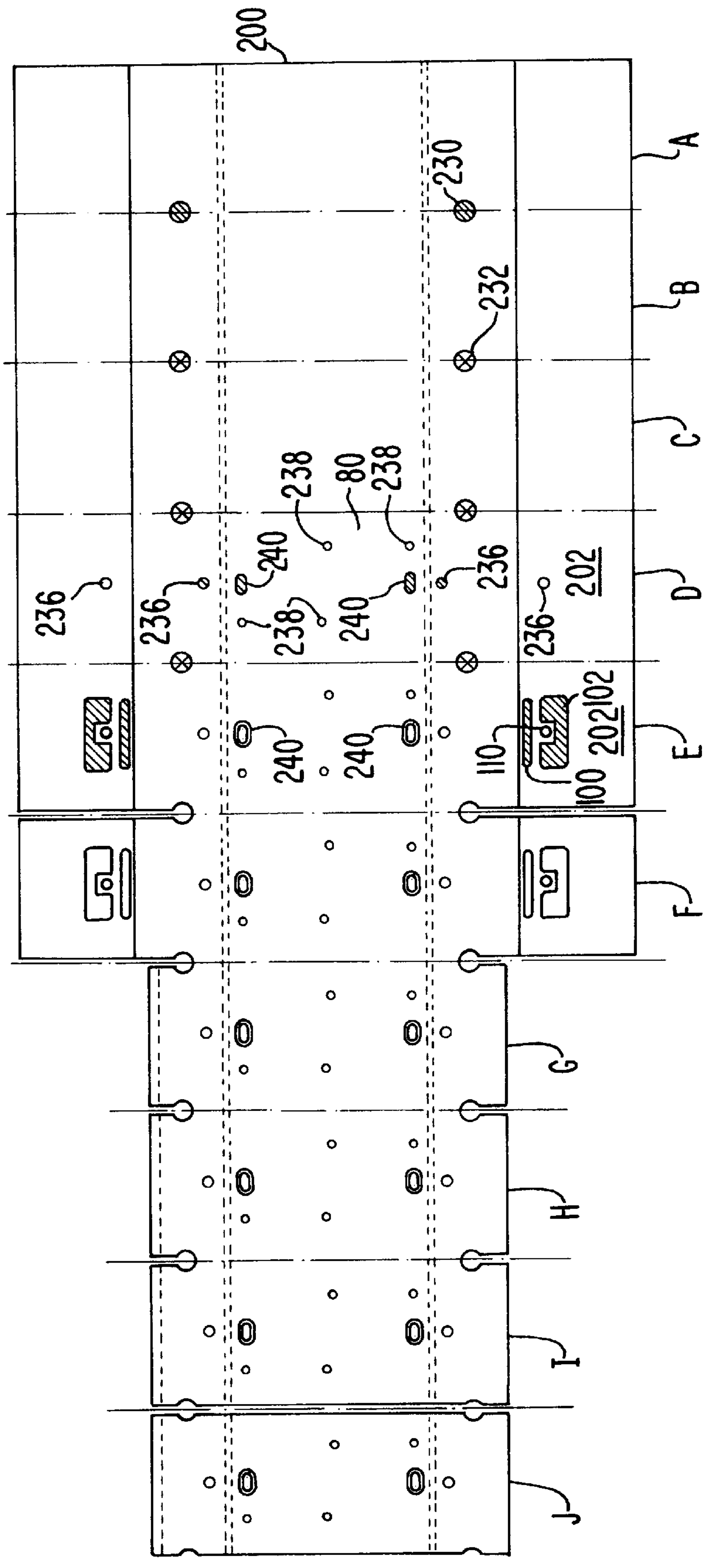
FIGS. 16–19 illustrate a processing sequence of an extruded metal blank which is used to form the carriage of a preferred embodiment of the present invention.
Figure 17:
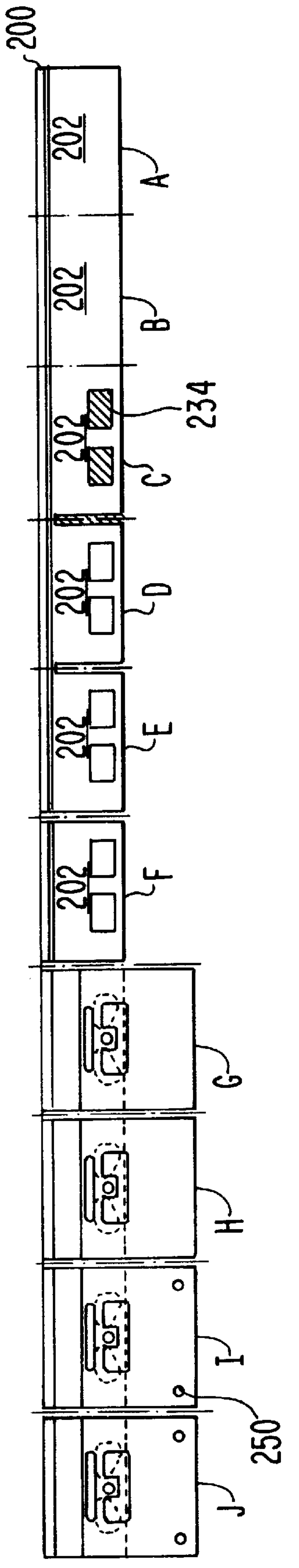

FIGS. 16–19 illustrate metal processing of the aluminum extrusion which is used to form the carriage as described above in the preferred embodiment of the present invention. Each station in each of the FIGS. 16 and 17 is labelled with letters identifying processing zones. In each figure, stations labelled with the same letter are corresponding top and side elevational views of the same station of metal processing. The stations A–J represent the extruded metal blank 200 at different processing points passing through a multi-station progressive die (not illustrated).

Figure 19:
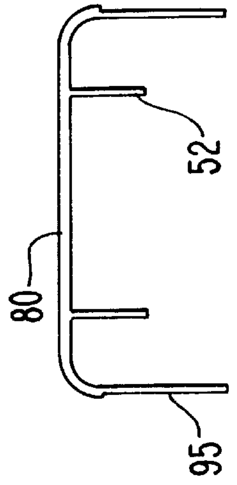
Figure 18:
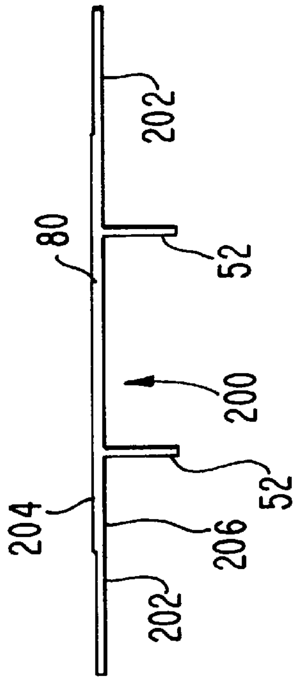

FIG. 18 illustrates an end view of the metal blank 200 prior to processing by the multistation progressive die and FIG. 19 illustrates an end view of the metal blank 200 after processing is completed. The blank 200 in FIG. 18 has a center section 80 and two outboard sections 202 respectively extending from the center section. The top surface 204 and the bottom surface 206 of the sections 80 and 202 are each disposed generally in a plane. The members 52 extend an equal distance orthogonally from the surface 206 of the center section.

Figure 5:
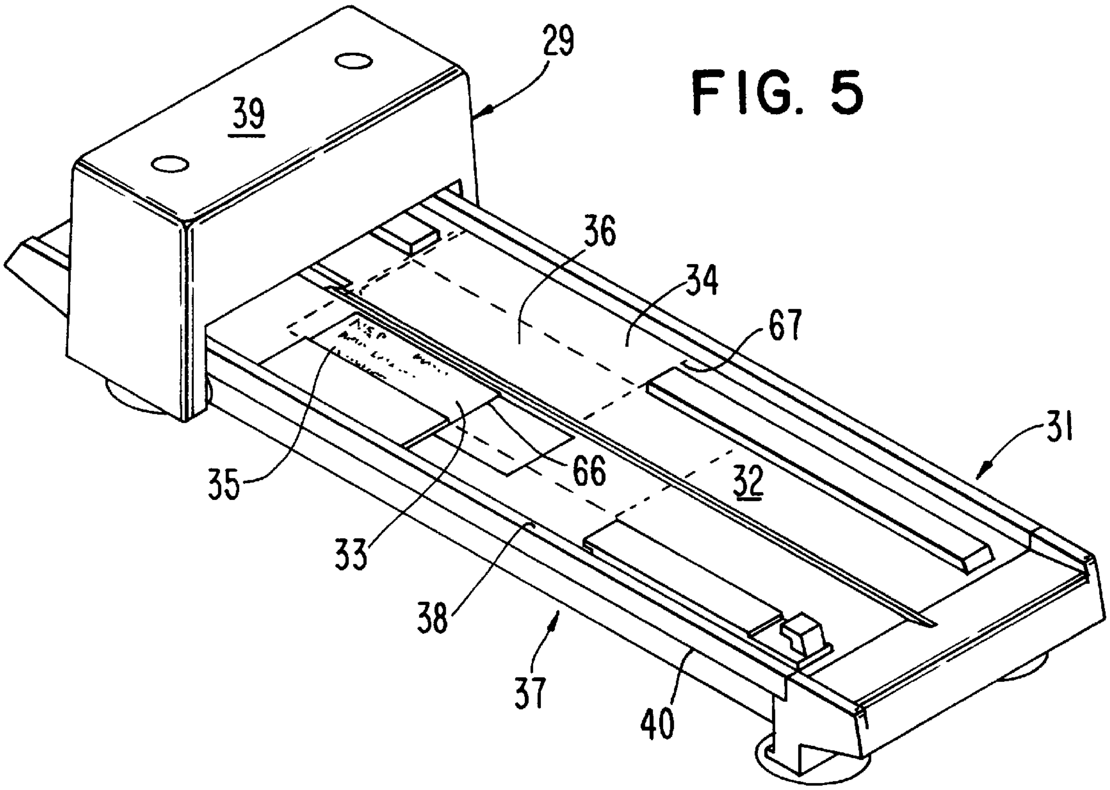
FIG. 5 illustrates a perspective view of an imprinter in accordance with the present invention.
Figure 6:
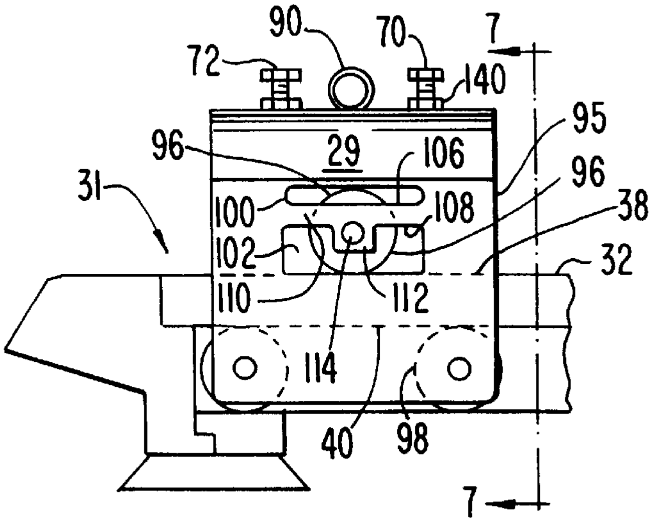
FIG. 6 illustrates a partial side elevational view of an imprinter in accordance with the present invention which shows the downwardly depending opposed sides of the carriage assembly.
Figure 7:
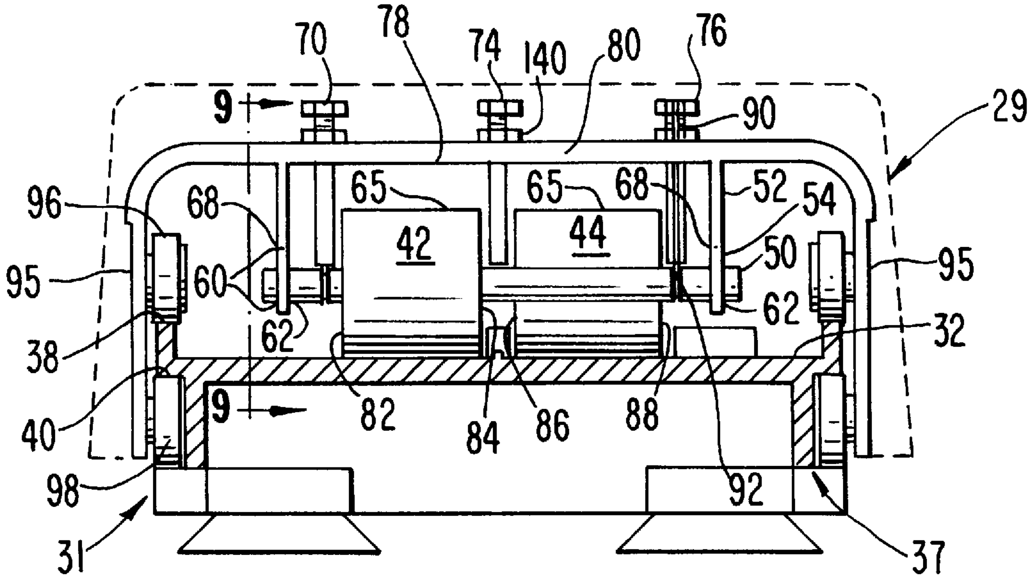
FIG. 7 illustrates an end view of an imprinter in accordance with the present invention including the carriage assembly.
Figure 8:
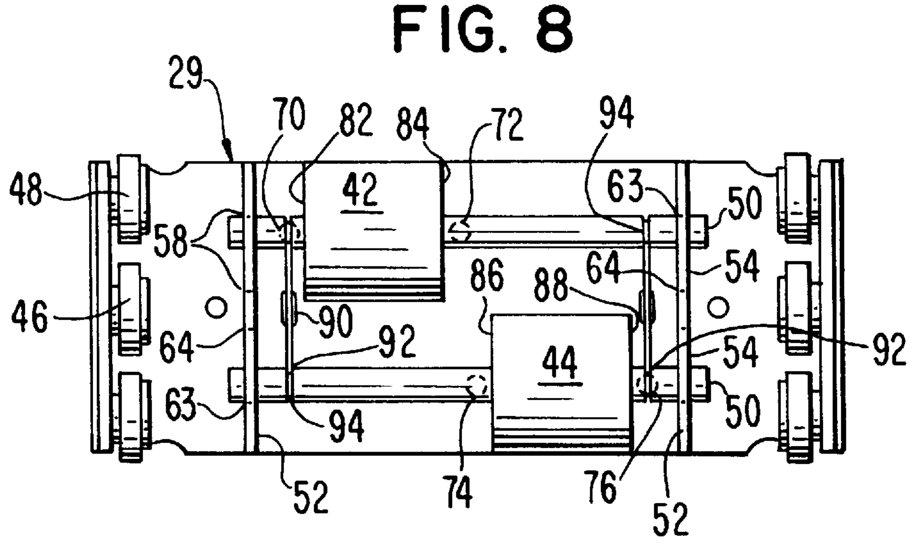
FIG. 8 illustrates a bottom view of the carriage assembly.

The stations A–J are described as follows. The station A installs two tooling holes 230 which are used in later stations to guide and locate the part. In the station B, guide pins 232 are located in the part for processing in following stations. In the station C, a cam pierces square holes 234 which correspond to the first and second pairs of openings 54 described above. In the station D, holes 236, 238 and 240 are pierced in the top surface of the metal section 200. The holes 236 located in the outboard sections 202, which are later bent orthogonally to define the sides 95 of the carriage 29, correspond to the location of the upper wheel 96. The holes 236, which are located in the center section 80, are used for attaching a handle 39 to the top of the carriage 29 which is illustrated in FIG. 5. The holes 238 correspond to the locations of the first, second, third and fourth stops 70, 72, 74 and 76. The holes 240 correspond to the location of the hairsprings 90. The station E pierces the outboard sections 202 to form the upper cutout area 100 and the lower cutout area 102 and extrudes two top openings 240 which are too small for conventional piercing. The station F is open to house the mechanics used for the station G. The station H is open to house part of the mechanics used in the station G where bending of the outboard sides was performed to produce the sides 95. At the station I, a progression cam pierces four holes 250 for the bearing wheel spigots to be installed for the lower wheels 98. At station J, the part is severed from the continuous strip.

At this point it should be noted that the piercing of the holes 234 which correspond to the first and second pairs of openings 54 and the upper area 100 and lower area 102 is performed with inexpensive tooling as a consequence of access being provided to the downwardly extending members 52 without occlusion by the opposed sides 95 of the carriage which permits the piercing of the zones 234 and further access being available from the top for the outboard sides 202 to pierce the areas 100 and 102 defining the rib. The Assignee has determined that an overall savings of approximately $35,000 (Canadian) is achievable by sequentially piercing the holes 234 and areas 100 and 102 prior to bending of the outboard sides 202 prior to forming the sides 95 of the carriage 22 by performing bending as illustrated at the station G.

While the invention has been described in terms of its preferred embodiments, it should be understood that numerous modifications may be made thereto without departing from the spirit and scope of the invention as defined in the appended claims. It is intended that all such modifications fall within the scope of the appended claims.

I claim:

1. A process for manufacturing metallic carriage of an imprinter comprising the steps of:

extruding a metallic blank into an article having a center section, two outboard sections respectively extending from the center section with a surface of the sections being coplanar and a pair of members which are symmetrically located with respect to a center line of the center section and which respectively extend an equal distance orthogonally from a surface of the center section;

forming first and second pairs of openings within the members with a first slot of each pair of openings being disposed in one of the members and a second opening of each of the pair of openings being disposed in another of the members with the first and second pairs of openings being adapted to respectively receive axles supporting first and second rolling platens used for imprinting characters of a pair of print bearing elements onto a print receiving element; and bending the outboard sections thereby forming opposed sides of the carriage extending orthogonally relative to the center section to position the sections to permit attachment of wheels rotatably supporting movement of the carriage on rails of the base after forming of the openings is completed.

2. A process in accordance with claim 1 further comprising:

cutting cutout areas in the outboard sections which define a rib prior to the bending of the outboard sections to form the opposed sides;

mounting an upper wheel on each rib, with each upper wheel being adapted to roll in contact with an upper rail of a base of the imprinter, and mounting an additional pair of lower wheels, with each lower wheel being which are adapted to roll in contact with a lower rail of the base of the imprinter, on each of the opposed sides after bending is completed to form the opposed sides;

attaching the carriage to the base so that the wheels roll on the rails; and shifting the ribs to set a spacing between the upper wheel attached to each rib and the additional pair of lower wheels on each of the opposed sides to within a set range to define clearance between the wheels and the upper and lower rails of the imprinter.

3. A process in accordance with claim 2 further comprising:

piercing the center section of the extruded article with first, second, third and fourth spaced apart holes;

attaching first, second, third and fourth stops to the center section of the article by engagement respectively within the first, second, third and fourth spaced apart holes and adjusting an extension of the stops from the center section toward a flatbed of the base after joining the carriage to the base and placing axles of the carriage within the first and second pairs of openings to limit travel of axles of first and second rolling platens received within opposed openings within the members orthogonally away from the flatbed during imprinting to establish a position of the rolling platens during imprinting.

4. A process in accordance with claim 3 wherein:

the first and second pairs of openings have a width in a direction parallel to a direction of extension of the members and a length orthogonal to the direction of extension of the members which width and length is greater in diameter than the axles which permits the axles to move orthogonally away from a flatbed of an imprinter base when the carriage is attached to the base when an outside periphery of the first and second rolling platens has insufficient clearance to clear at least one character bearing element disposed on the flatbed during motion of the carriage in first and second directions along the flatbed and the width of the first and second pairs of openings permits the axles to roll free between first and second ends of the pairs of the openings in the first and second directions during movement of the carriage in the first and second directions.

5. A process in accordance with claim 2 wherein:

the first and second pairs of openings have a width in a direction parallel to a direction of extension of the members and a length orthogonal to the direction of extension of the members which width and length is greater in diameter than the axles which permits the axles to move orthogonally away from a flatbed of an imprinter base when the carriage is attached to the base when an outside periphery of the first and second rolling platens has insufficient clearance to clear at least one character bearing element disposed on the flatbed during motion of the carriage in first and second directions along the flatbed and the width of the first and second pairs of openings permits the axles to roll free between first and second ends of the pairs of the openings in the first and second directions during movement of the carriage in the first and second directions.

6. A process in accordance with claim 1 wherein:

the first and second pairs of openings have a width in a direction parallel to a direction of extension of the members and a length orthogonal to the direction of extension of the members which width and length is greater in diameter than the axles which permits the axles to move orthogonally away from a flatbed of an imprinter base when the carriage is attached to the base when an outside periphery of the first and second rolling platens has insufficient clearance to clear at least one character bearing element disposed on the flatbed during motion of the carriage in first and second directions along the flatbed and the width of the first and second pairs of openings permits the axles to roll free between first and second ends of the pairs of the openings in the first and second directions during movement of the carriage in the first and second directions.

* * * * *